(12) United States Patent
Whitney et al.

(10) Patent No.: US 7,757,666 B2
(45) Date of Patent: Jul. 20, 2010

(54) CYLINDER FUELING COORDINATION FOR TORQUE ESTIMATION AND CONTROL

(75) Inventors: Christopher E. Whitney, Highland, MI (US); Mark D. Carr, Fenton, MI (US); Jeffrey M. Kaiser, Highland, MI (US); Michael J. Pitsch, Ann Arbor, MI (US); Bahram Younessi, Farmington, MI (US)

(73) Assignee: GM Global Technology Operations, Inc.

( * ) Notice: Subject to any disclaimer, the term of this patent is extended or adjusted under 35 U.S.C. 154(b) by 2 days.

(21) Appl. No.: 12/259,469

(22) Filed: Oct. 28, 2008

(65) Prior Publication Data

US 2009/0118977 A1 May 7, 2009

Related U.S. Application Data

(60) Provisional application No. 60/985,533, filed on Nov. 5, 2007.

(51) Int. Cl.
*F02D 17/00* (2006.01)
(52) U.S. Cl. .................... 123/481; 123/198 DB
(58) Field of Classification Search ............ 123/481, 123/198 DB, 198 F, 198 D, 332, 406.24
See application file for complete search history.

(56) References Cited

U.S. PATENT DOCUMENTS

| | | | | |
|---|---|---|---|---|
| 5,463,551 A | * | 10/1995 | Milunas | 701/91 |
| 5,769,054 A | * | 6/1998 | Schnaibel et al. | 123/406.47 |
| 5,797,371 A | * | 8/1998 | Nonaka | 123/481 |
| 6,178,371 B1 | * | 1/2001 | Light et al. | 701/93 |
| 6,619,258 B2 | * | 9/2003 | McKay et al. | 123/350 |
| 6,694,946 B1 | * | 2/2004 | Gaskins | 123/339.11 |
| 6,939,266 B2 | * | 9/2005 | Koerner et al. | 477/109 |
| 7,004,148 B2 | * | 2/2006 | Yokoi et al. | 123/481 |
| 7,225,782 B2 | * | 6/2007 | Pallett et al. | 123/192.1 |
| 7,246,594 B2 | * | 7/2007 | Hartmann | 123/198 F |
| 7,328,686 B2 | * | 2/2008 | Cullen | 123/325 |

* cited by examiner

*Primary Examiner*—Hai H Huynh (57) ABSTRACT

An engine control system comprises a torque control module and a fueling control module. The torque control module selectively generates a deactivation signal for a first cylinder of a plurality of cylinders of an engine based on a torque request. The fueling control module halts fuel delivery to the first cylinder based on the deactivation signal. The torque control module increases a spark advance of the engine at a first time after the fueling control module halts fuel injection for the first cylinder. The first time corresponds to an initial time combustion fails to occur in the first cylinder because fuel delivery has been halted.

20 Claims, 6 Drawing Sheets

CYLINDER FUELING COORDINATION FOR TORQUE ESTIMATION AND CONTROL

CROSS-REFERENCE TO RELATED APPLICATIONS

This application claims the benefit of U.S. Provisional Application No. 60/985,533, filed on Nov. 5, 2007. The disclosure of the above application is incorporated herein by reference.

FIELD

The present disclosure relates to torque estimation and control, and more particularly to coordinating cylinder fueling and spark timing in torque estimation and control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Torque model data is often gathered on a dynamometer with all cylinders of an engine being fueled. However, some engines now use partial cylinder deactivation to reduce pumping losses and increase fuel economy. For example, four cylinders out of an eight cylinder engine may be deactivated to reduce pumping losses. In addition, some engines may deactivate all cylinders of the engine during deceleration, which reduces fuel usage. In addition, the pumping losses and rubbing friction of the engine with all cylinders deactivated may create a negative torque (braking torque) that helps to slow the vehicle. To accommodate these types of engines, adjustments may be made for torque estimation and control to account for the number of cylinders that are actually being fueled.

The torque produced by the activated (fueled) cylinders may be referred to as indicated torque or cylinder torque. Flywheel torque may be determined by subtracting rubbing friction, pumping losses, and accessory loads from the indicated torque. Therefore, in one approach to estimating torque with partial cylinder deactivation, the indicated torque is multiplied by a fraction of cylinders being fueled to determine a fractional indicated torque. The fraction is the number of cylinders being fueled divided by the total number of cylinders. Rubbing friction, pumping losses, and accessory loads can be subtracted from the fractional indicated torque to estimate an average torque at the flywheel (brake torque) for partial cylinder deactivation.

SUMMARY

An engine control system comprises a torque control module and a fueling control module. The torque control module selectively generates a deactivation signal for a first cylinder of a plurality of cylinders of an engine based on a torque request. The fueling control module halts fuel delivery to the first cylinder based on the deactivation signal. The torque control module increases a spark advance of the engine at a first time after the fueling control module halts fuel injection for the first cylinder. The first time corresponds to an initial time combustion fails to occur in the first cylinder because fuel delivery has been halted.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In an internal combustion engine, fuel and spark are relatively fast actuators. The term fast is used in contrast to air flow (which may be measured as air per cylinder), which changes slowly as the throttle valve opens or closes. Removing fuel from one or more cylinders (deactivating the cylinders) and decreasing (retarding) the spark advance can both be used to achieve fast changes in brake torque.

When controlling an internal combustion engine, a rapid transition to minimum torque may be requested. The minimum torque the engine can produce with all cylinders on is limited by the minimum amount of air flow needed to maintain adequate combustion in all cylinders. To reduce the torque of the engine even further, cylinders are deactivated.

A minimum torque request may be made when the vehicle is decelerating, such as when the driver has removed their foot from the accelerator pedal. Minimum torque may be especially helpful for engine braking when traveling on downgrades. A smooth transition to minimum engine off torque can also be used when shutting down the engine, such as in a hybrid application. For example, in a hybrid application, the engine may be powered down when the vehicle comes to a stop. Rapid torque reductions may also be used to prevent engine flare when the clutch pedal of a manual transmission is depressed.

Cylinders can be individually turned off for a step-wise reduction in torque. However, abrupt changes in torque may be transmitted through the frame and perceived as a noise, vibration, or harshness issue. To create a smooth torque ramp, cylinder deactivation can be combined with changes in spark advance to produce a smooth torque reduction without points of discontinuity. In order to achieve this smooth response, spark advance is closely synchronized with cylinder deactivation.

Instead of experiencing an abrupt torque reduction when a cylinder is deactivated, the ignition system can advance the spark at the same time that the cylinder is deactivated. The increased spark advance offsets the torque reduction from the cylinder deactivation. The spark advance can then be ramped to a lower value.

At this time, the next cylinder can be turned off, with another corresponding increase in spark advance. This can be repeated for each cylinder, with the spark advance smoothing the transitions when cylinders are deactivated. A similar scheme can be used for smoothing increasing torque as cylinders are reactivated. For example, this may be used when the internal combustion engine in a hybrid application is restarted or when a driver once again depresses the accelerator pedal on a downgrade.

Figure 1:
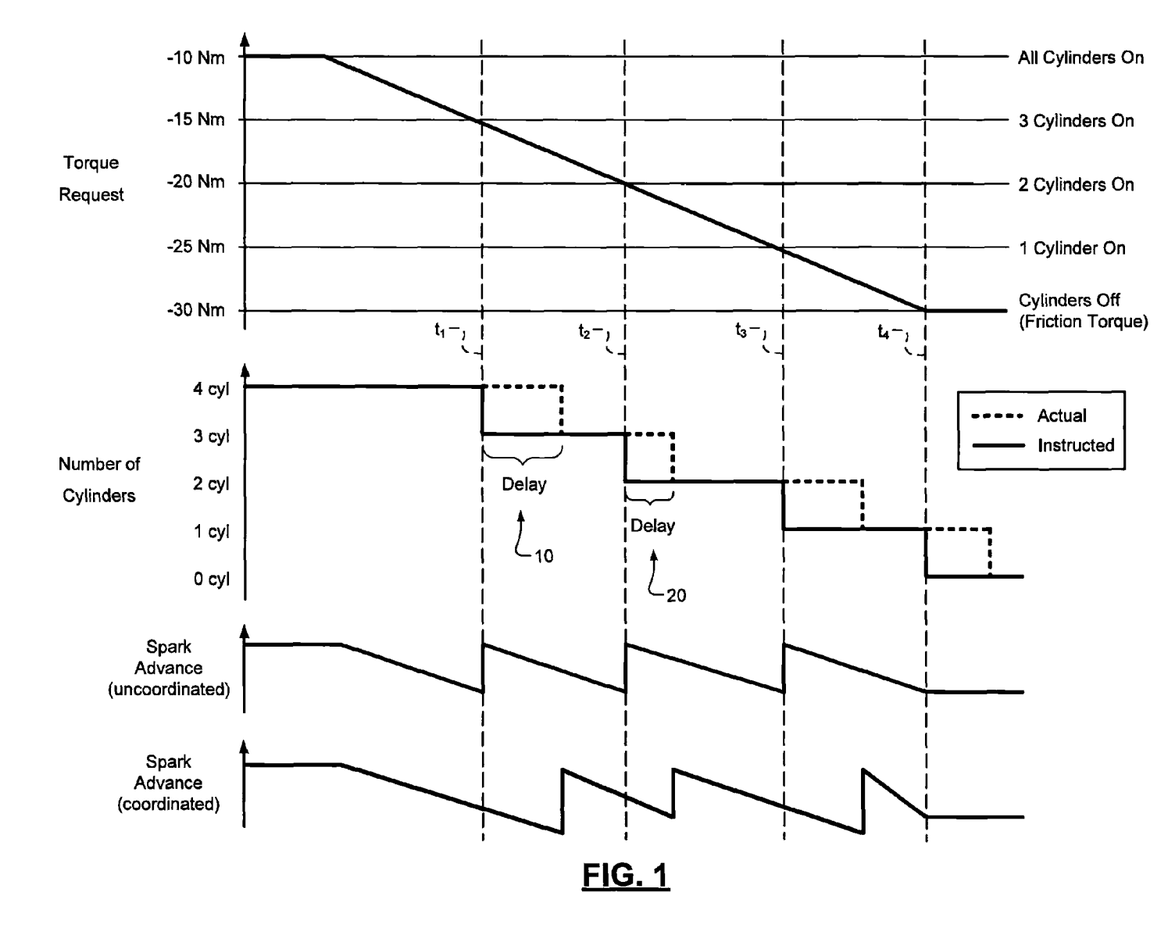
FIG. 1 is a graphical depiction of a decreasing torque request and corresponding cylinder deactivation and spark advance for an exemplary 4-cylinder engine.

An example of a strategy where spark advance offsets large decreases in torque from cylinder deactivation is shown in FIG. 1. FIG. 1 also depicts the difference between when a cylinder is commanded to be deactivated and when the cylinder actually is deactivated. Because of the close coupling between cylinder deactivation and spark advance, FIG. 1 shows how spark advance is affected by the delay in actual cylinder deactivation.

In addition to the coordination between spark advance and cylinder deactivation for torque control, coordination is also useful for torque estimation. Torque estimation is used to control engine parameters, and may be used by a hybrid controller to determine current or future torque requested from an electric motor. If the torque estimation function receives notice of a cylinder being deactivated without receiving notice of the corresponding increase in spark advance, torque estimation may erroneously estimate a negative spike in torque.

Figure 2:
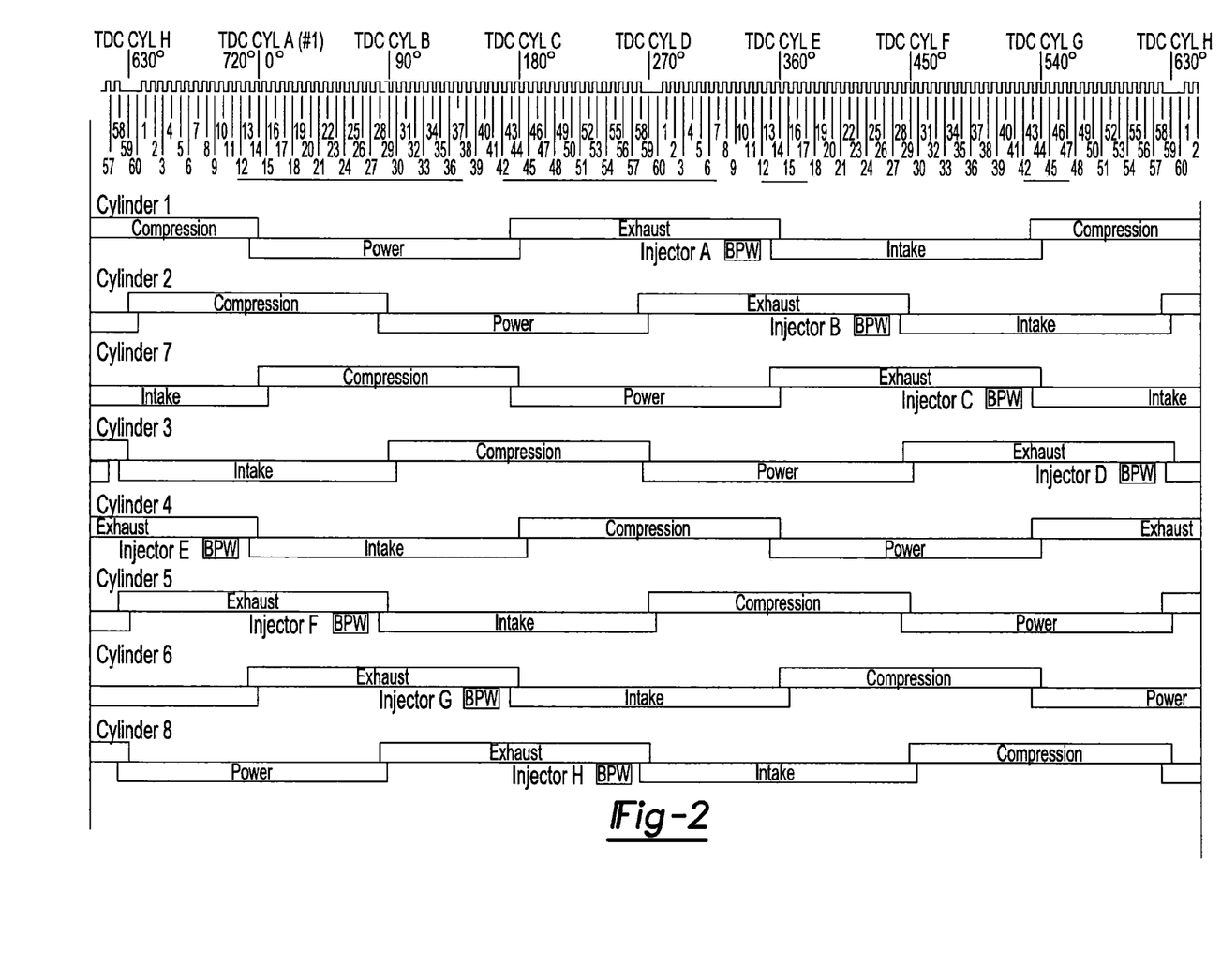
FIG. 2 is a graphical depiction of cylinder event timing in an exemplary V8 engine.

Therefore, when control is able to provide cylinder deactivation information at the same time as the corresponding spark advance, torque estimation may be able to incorporate the combined effects of both changes. FIG. 2 shows an exemplary cylinder firing diagram for a V8 engine, which illustrates why there may be a delay between a cylinder deactivation command and actual cylinder deactivation.

Figure 3:
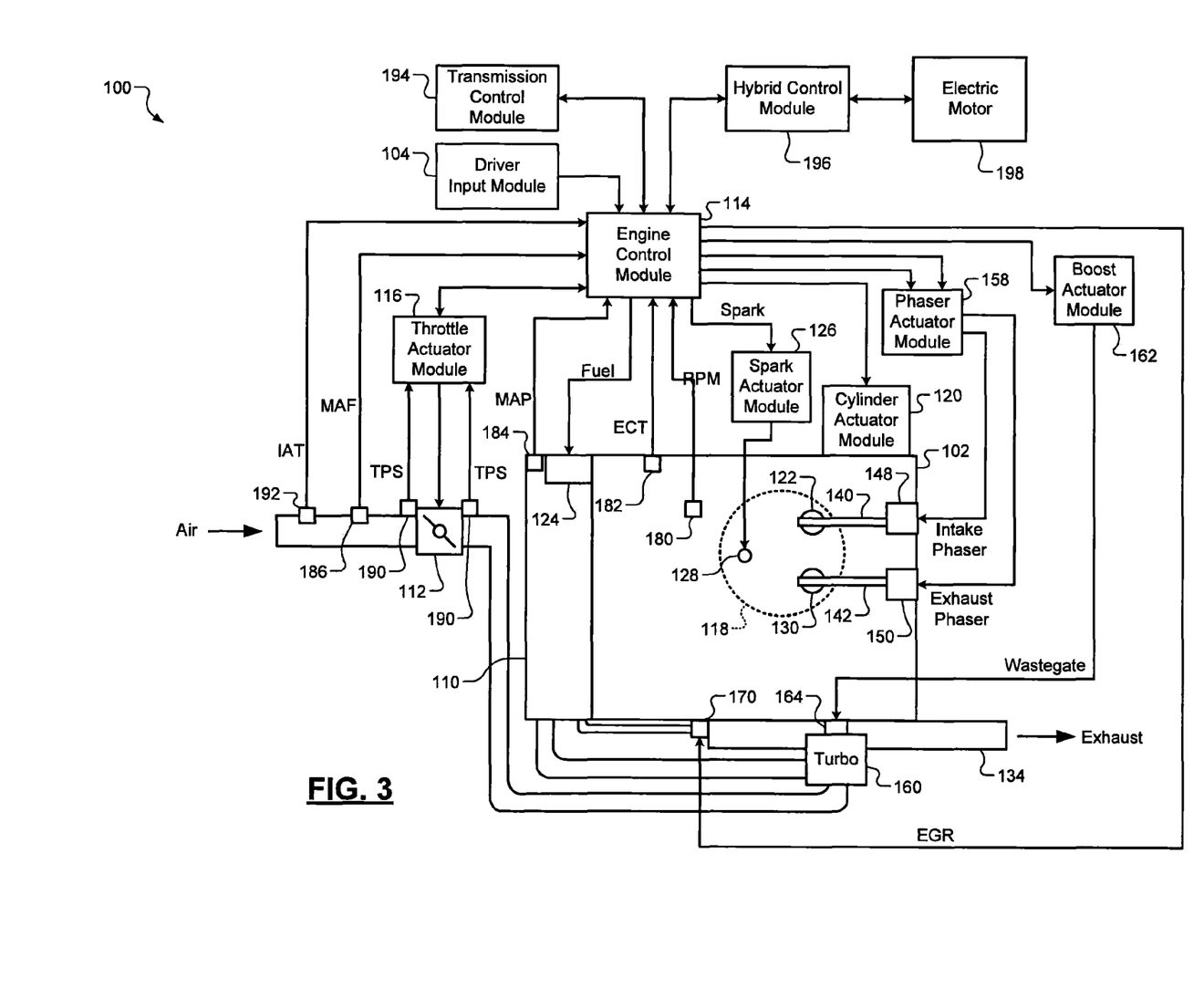
FIG. 3 is a functional block diagram of an exemplary engine system.
Figure 4:
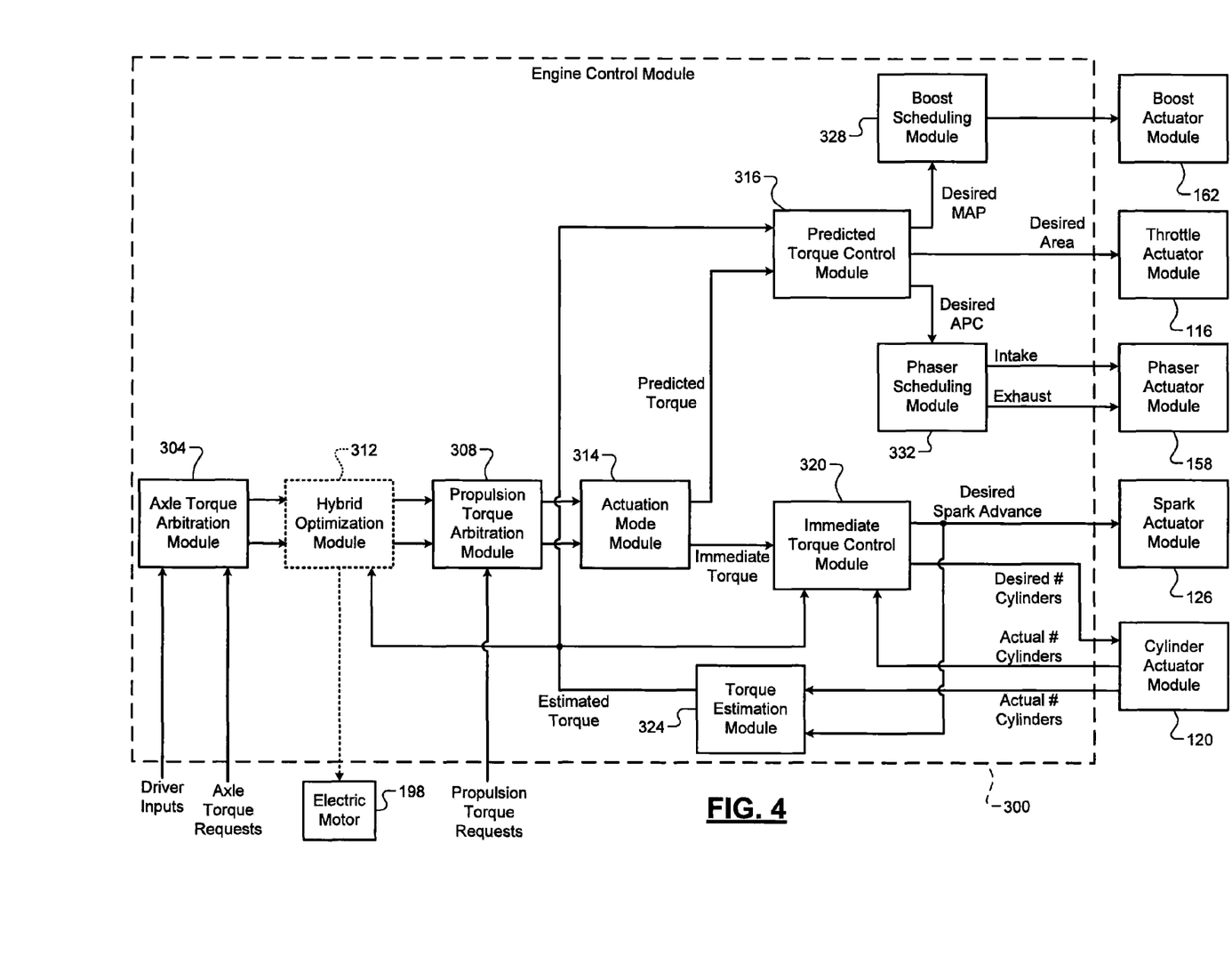
FIG. 4 is a functional block diagram of an exemplary engine control system.
Figure 5:
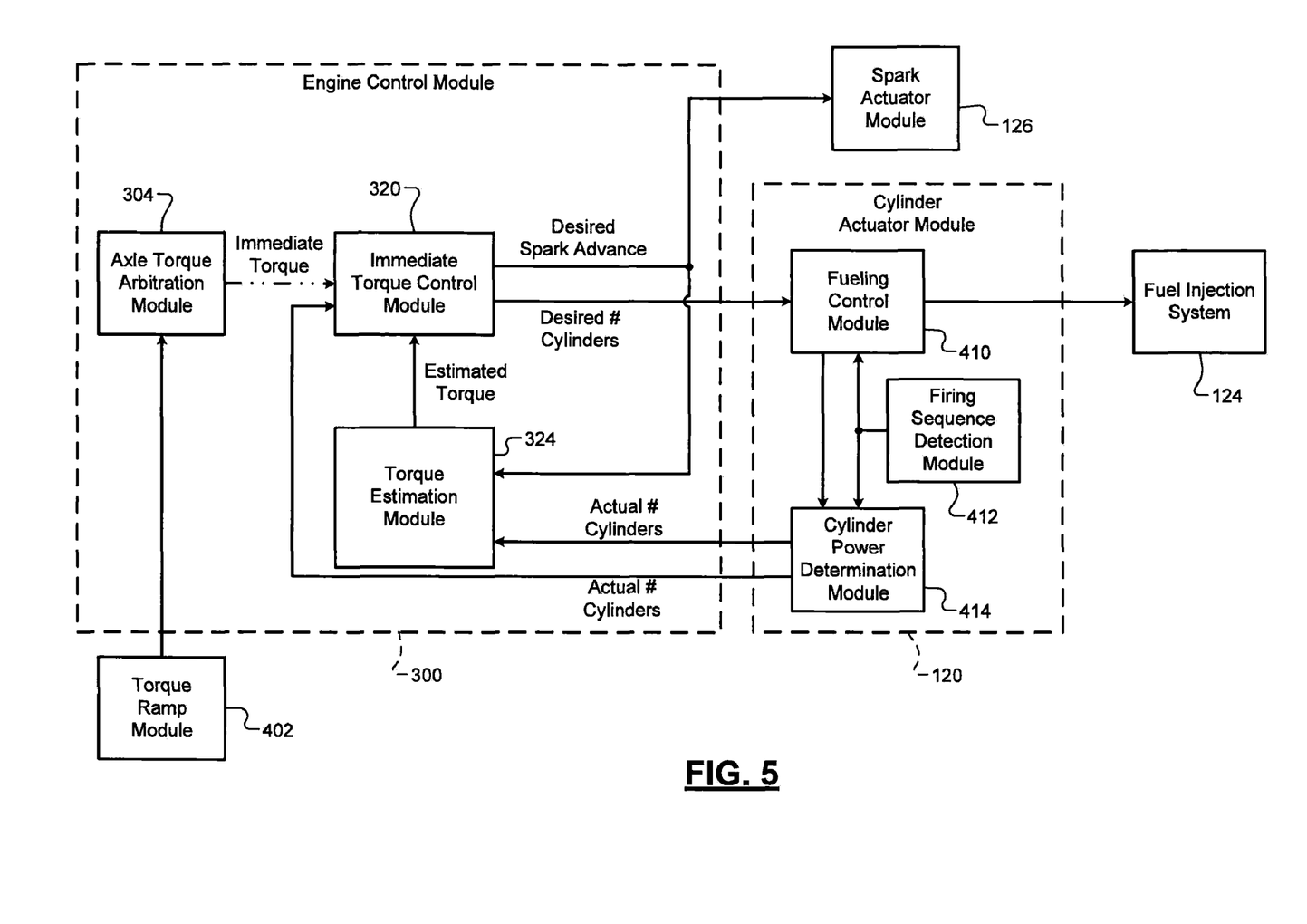
FIG. 5 is a functional block diagram of elements of the exemplary engine control system of FIG. 4.
Figure 6:
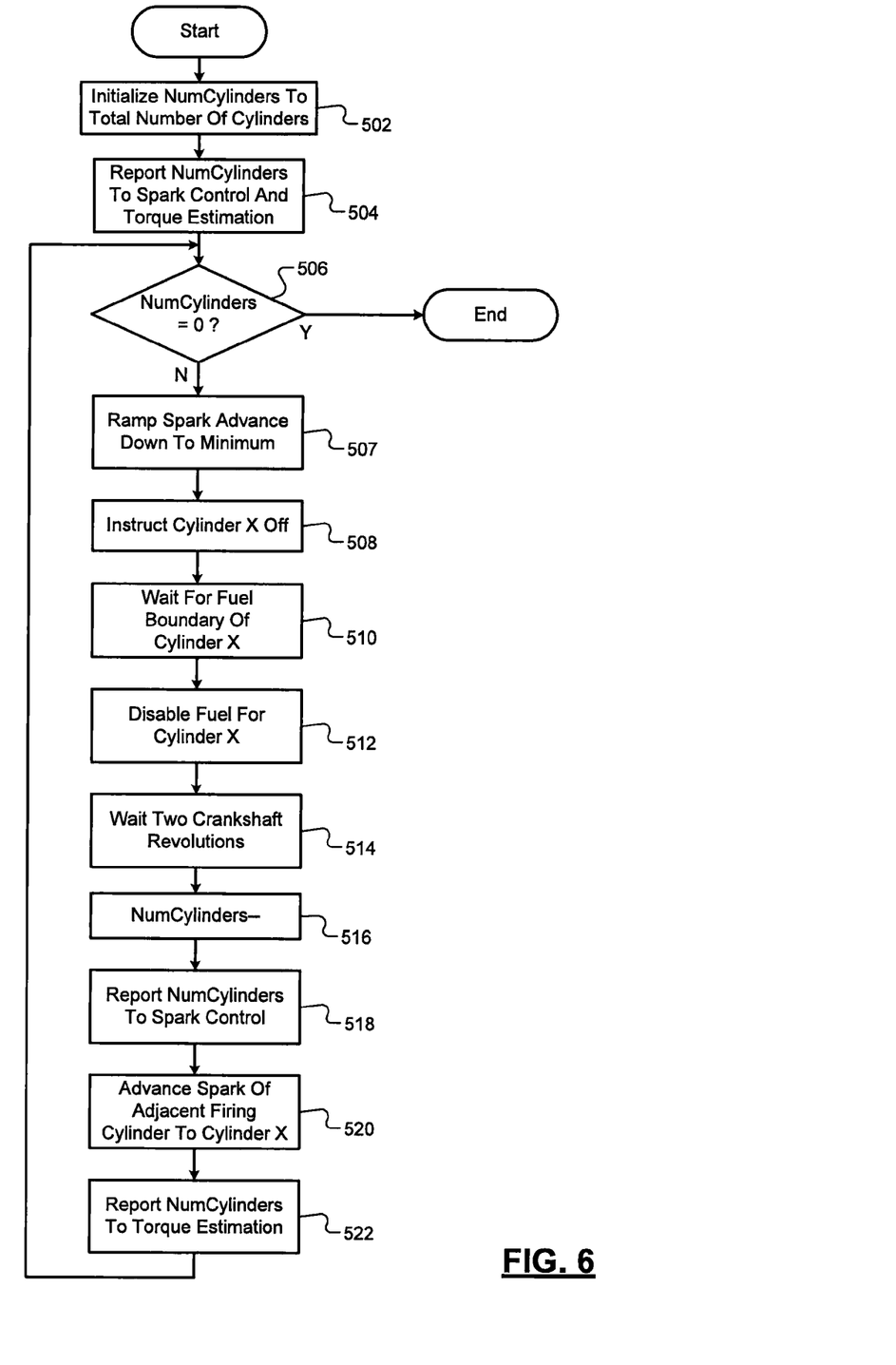
FIG. 6 is a flowchart that depicts exemplary steps performed by the elements shown in FIG. 5 to coordinate cylinder deactivation and spark advance.

FIG. 3 depicts an engine system where fuel control is coordinated with spark control. FIG. 4 depicts exemplary components of an engine control module of the engine system. FIG. 5 depicts in greater detail certain components that are used to coordinate fueling and spark advance for the exemplary engine system. FIG. 6 depicts exemplary control steps used in determining and applying coordinated fueling and spark advance parameters.

Referring now to FIG. 1, a graphical depiction of a decreasing torque request, cylinder deactivation, and spark advance for an exemplary 4-cylinder engine is presented. The torque request begins at a minimum air torque, which is −10 Nm in this example. The minimum air torque represents the torque produced when all cylinders are fueled and the minimum amount of air for proper combustion is provided to the cylinders.

The torque ramp then decreases until the minimum engine off torque is reached, which is −30 Nm in this example. At the minimum engine off torque, no fuel is provided to the cylinders and therefore no torque is being generated. Negative torque is created by friction in the engine, and may also be created by pumping losses resulting from the pistons drawing in, compressing, and expelling air.

Also indicated are the approximate average torques of the engine with 3, 2, and 1 cylinders activated, which are −15 Nm, −20 Nm and −25 Nm, respectively. At time $t_1$, the number of cylinders is instructed to reduce from four to three. After a delay 10, the number of cylinders actually activated decreases from four to three.

At time $t_2$, the number of cylinders instructed to be activated is decreased from three to two. After a delay 20, the actual number of cylinders activated decreases from three to two. As seen in FIG. 1, delays, such as delay 10 and delay 20, are not necessarily equal. This will be explained below with respect to FIG. 2.

FIG. 1 also shows an uncoordinated spark advance, where the spark advance is set based upon the instructed number of activated cylinders. Therefore, at time $t_1$, the uncoordinated spark advance increases to offset the decrease in torque caused by the cylinder reduction. However, because the cylinder was not actually deactivated until after the delay 10, the increase in the uncoordinated spark advance would cause a spike in engine torque. The spark advance then ramps to a minimum level, where the next cylinder can be deactivated. The minimum level may represent the lowest spark advance that will still result in stable combustion.

A coordinated spark advance is shown, which increases spark advance at times when the number of cylinders being fueled actually decreases. A graph of torque estimation (not shown) based on coordinated spark and fuel control will be fairly smooth. This is because torque estimation receives the decreased number of cylinders as spark control provides torque estimation with the newly updated spark advance. By contrast, a graph of torque estimation (also not shown) corresponding to the uncoordinated spark advance would have downward torque spikes as each cylinder was deactivated.

Referring now to FIG. 2, a graphical depiction of cylinder event timing in an exemplary V8 engine is presented. At the top of FIG. 2 is a square wave indicating teeth on a crankshaft wheel. The X axis represents crankshaft angle, and is shown between 0 and 720 degrees because cylinders fire every two crankshaft revolutions. The 8 cylinders are labeled with letters, from A to H. There are two gaps shown in the crankshaft teeth, one at top dead center (TDC) of cylinder D, and one at TDC of cylinder H. These gaps may be used for synchronizing the crankshaft signal. The time when the piston is at its topmost position, which is the point at which the air/fuel mixture is most compressed, is referred to as TDC.

A portion of the crankshaft period on the right of FIG. 2 is repeated on the left of FIG. 2. This explains why TDC of cylinder H appears at both the left and the right. Ignition timing control may occur at a defined time for each cylinder. For example only, these events may be defined at 72° or 73.5° before TDC of each cylinder.

Timelines of the four strokes (intake, compression, power and exhaust) are shown for each cylinder. The cylinders are arranged in firing order from top to bottom, A to H. The physical cylinder number is indicated at the left of each timeline.

The end of the intake stroke for a cylinder may be defined as the time when the corresponding intake valve closes. The fuel boundary represents the last time at which fuel released from the fuel injectors will make it into the combustion chamber in that intake stroke. Normally, this will be slightly before the end of the intake stroke. For applications where fuel is injected directly into the combustion chamber, the fuel boundary may be at or after the end of the intake stroke.

After the fuel boundary, the fuel injector corresponding to the cylinder can begin spraying fuel for the next intake stroke. The fuel injector may spray fuel during the exhaust stroke so that a fuel-air mixture will be ready when the intake valve opens. Fuel may be sprayed earlier, such as in the compression or power strokes, to allow for more mixing of air and fuel and/or to allow for more time in which to inject a greater amount of fuel.

Because of the long period during which fuel may be sprayed, deactivating fuel to a cylinder may be done at the fuel boundaries. Therefore, when a request to deactivate cylinder 1 is received, the fuel injector for cylinder 1 is not deactivated until the next fuel boundary is reached. If the request is received slightly after a fuel boundary, nearly two crankshaft revolutions will occur before the fuel boundary is again reached.

Even after the fuel injector is disabled following the fuel boundary, the combustion chamber will already contain the previously sprayed fuel. The compression, power, and exhaust strokes therefore operate with the fuel that was previously injected. When the next intake stroke is reached, there is little or no fuel, as the fuel injector has been disabled for the last four strokes.

At this point, the combustion chamber contains only air. The compression stroke then compresses the air in the cylinder, and during the power stroke, no fuel-air mixture is present to ignite. This is the time at which the reduced torque from deactivating the cylinder is actually realized.

As seen in the example timing diagram of FIG. 2, cylinder 8 fires before cylinder 1 would have fired, while cylinder 2 fires after cylinder 1 would have fired. The spark can be advanced starting with either the firing of cylinder 8 or the firing of cylinder 2. In four-cylinder applications, there may not be enough time to advance the spark for the cylinder firing before cylinder 1. In such cases, the spark will be advanced for the cylinder firing after cylinder 1.

The spark advance can then be gradually reduced by following the torque command through the use of a torque model until the next cylinder is deactivated. The variable delay in FIG. 1 can now be understood. If a cylinder deactivation request is received immediately after the fuel boundary for that cylinder, two crankshaft revolutions will pass before the fuel injector for that cylinder can be disabled. In the next two crankshaft revolutions, the fuel previously sprayed is combusted and exhausted. The following intake and compression strokes operate on air that does not have injected fuel. At the power stroke, one crankshaft revolution after the intake stroke, there is no air/fuel mixture to ignite, and the average torque of the engine is therefore reduced.

On the other hand, if a cylinder deactivation request is received immediately before a fuel boundary, when the fuel boundary is reached, the fuel injector for that cylinder will be disabled. Then, after two crankshaft revolutions, the intake stroke draws in air, and after one more crankshaft revolution, the air mixture is not ignited. Therefore, the variable delay shown in FIG. 1 may vary between three and five crankshaft revolutions.

Referring now to FIG. 3, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124 to achieve a desired air/fuel ratio. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders. The cylinder actuator module 120 may control to which cylinders the fuel injection system 124 injects fuel.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to TDC.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The turbocharger 160 may compress air before the air reaches the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164.

An intercooler (not shown) may dissipate some of the compressed air charge's heat, which is generated by air being compressed and may by the air's proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. In various implementations, the EGR valve 170 may be located after the turbocharger 160. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift. The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. In various implementations, the ECM 114, the transmission control module 194, and the hybrid control module 196 may be integrated into one or more modules.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position or actuator value.

Similarly, the spark actuator module 126 can be referred to as an actuator, while the corresponding actuator position may be the amount of spark advance. Other actuators may include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

Referring now to FIG. 4, a functional block diagram of an exemplary engine control system is presented. An engine control module (ECM) 300 includes an axle torque arbitration module 304. The axle torque arbitration module 304 arbitrates between driver inputs from the driver input module 104 and other axle torque requests. For example, driver inputs may include accelerator pedal position.

Other axle torque requests may include a torque reduction requested during wheel slip by a traction control system and torque requests to control speed from a cruise control system. Torque requests may include target torque values as well as ramp requests, such as a request to ramp torque down to the minimum engine off torque or ramp torque up from the minimum engine off torque.

Axle torque requests may also include requests from an adaptive cruise control module, which may vary a torque request to maintain a predetermined following distance. Axle torque requests may also include torque increases due to negative wheel slip, such as where a tire of the vehicle slips with respect to the road surface when the torque produced by the engine is negative.

Axle torque requests may also include brake torque management requests and torque requests intended to prevent vehicle over-speed conditions. Brake torque management requests may reduce engine torque to ensure that engine torque does not exceed the ability of the brakes to hold the vehicle when the vehicle is stopped. Axle torque requests may also be made by body stability control systems. Axle torque requests may further include engine cutoff requests, such as may be generated when a critical fault is detected.

The axle torque arbitration module 304 outputs a predicted torque and an immediate torque. The predicted torque is the amount of torque that will be required in the future to meet the driver's torque request and/or speed requests. The immediate torque is the amount of currently required to meet temporary torque requests, such as torque reductions when shifting gears or when traction control senses wheel slippage.

The immediate torque may be achieved by engine actuators that respond quickly, while slower engine actuators may be targeted to achieve the predicted torque. For example, a spark actuator may be able to quickly change spark advance, while cam phaser or throttle actuators may be slower to respond because of air transport delays in the intake manifold. The axle torque arbitration module 304 outputs the predicted torque and the immediate torque to a propulsion torque arbitration module 308.

In various implementations, the axle torque arbitration module 304 may output the predicted torque and immediate torque to a hybrid optimization module 312. The hybrid optimization module 312 determines how much torque should be produced by the engine and how much torque should be produced by the electric motor 198. The hybrid optimization module 312 then outputs modified predicted and immediate torque values to the propulsion torque arbitration module 308. In various implementations, the hybrid optimization module 312 may be implemented in the hybrid control module 196 of FIG. 1.

The predicted and immediate torques received by the propulsion torque arbitration module 308 are converted from the axle torque domain (at the wheels) into the propulsion torque domain (at the crankshaft). This conversion may occur before, after, or in place of the hybrid optimization module 312.

The propulsion torque arbitration module 308 arbitrates between the converted predicted and immediate torque and other propulsion torque requests. Propulsion torque requests may include torque reductions for engine over-speed protection, torque increases for stall prevention, and torque reductions requested by the transmission control module 194 to accommodate gear shifts. Propulsion torque requests may also include torque requests from a speed control module, which may control engine speed during idle and coastdown, such as when the driver removes their foot from the accelerator pedal.

Propulsion torque requests may also include a clutch fuel cutoff, which may reduce engine torque when the driver depresses the clutch pedal in a manual transmission vehicle. Various torque reserves may also be provided to the propulsion torque arbitration module 306 to allow for fast realization of those torque values should they be needed. For example, a reserve may be applied to allow for air conditioning compressor turn-on and/or for power steering pump torque demands.

A catalyst light-off or cold start emissions process may directly vary spark advance for an engine. A corresponding propulsion torque request may be made to balance out the change in spark advance. In addition, the air-fuel ratio of the engine and/or the mass air flow of the engine may be varied, such as by diagnostic intrusive equivalence ratio testing and/or new engine purging. Corresponding propulsion torque requests may be made to offset these changes.

Propulsion torque requests may also include a shutoff request, which may be initiated by detection of a critical fault. For example, critical faults may include vehicle theft detection, stuck starter motor detection, electronic throttle control problems, and unexpected torque increases. In various implementations, various requests, such as shutoff requests, may not be arbitrated. For example only, shutoff requests may always win arbitration or may override arbitration altogether. The propulsion torque arbitration module 306 may still receive these requests so that, for example, appropriate data can be fed back to other torque requesters. For example, all other torque requestors may be informed that they have lost arbitration.

An actuation mode module 314 receives the predicted torque and the immediate torque from the propulsion torque arbitration module 306. Based upon a mode setting, the actuation mode module 314 determines how the predicted and immediate torques will be achieved. For example, changing the throttle valve 112 allows for a wide range of torque control. However, opening and closing the throttle valve 112 is relatively slow.

Disabling cylinders provides for a wide range of torque control, but may produce drivability and emissions concerns. Changing spark advance is relatively fast, but does not provide much range of control. In addition, the amount of control possible with spark (spark capacity) changes as the amount of air entering the cylinder 118 changes.

According to the present disclosure, the throttle valve 112 may be closed just enough so that the desired immediate torque can be achieved by retarding the spark as far as possible. This provides for rapid resumption of the previous torque, as the spark can be quickly returned to its calibrated timing. In this way, the use of relatively slowly-responding throttle valve corrections is minimized by using the quickly-responding spark retard as much as possible.

The approach the actuation mode module 314 takes in meeting the immediate torque request is determined by a mode setting. The mode setting provided to the actuation mode module 314 may include an indication of modes including an inactive mode, a pleasible mode, a maximum range mode, and an auto actuation mode.

In the inactive mode, the actuation mode module 314 may ignore the immediate torque request. For example, the actuation mode module 314 may output the predicted torque to a predicted torque control module 316. The predicted torque control module 316 converts the predicted torque to desired actuator positions for slow actuators. For example, the predicted torque control module 316 may control desired manifold absolute pressure (MAP), desired throttle area, and/or desired air per cylinder (APC).

An immediate torque control module 320 determines desired actuator positions for fast actuators, such as desired spark advance. The actuation mode module 314 may instruct the immediate torque control module 320 to set the spark advance to a calibrated value, which achieves the maximum possible torque for a given airflow. In the inactive mode, the immediate torque request does not therefore reduce the amount of torque produced or cause the spark advance to deviate from calibrated values.

In the pleasible mode, the actuation mode module 314 may attempt to achieve the immediate torque request using only spark retard. This may mean that if the desired torque reduction is greater than the spark reserve capacity (amount of torque reduction achievable by spark retard), the torque reduction will not be achieved. The actuation mode module 314 may therefore output the predicted torque to the predicted torque control module 316 for conversion to a desired throttle area. The actuation mode module 314 may output the immediate torque request to the immediate torque control module 320, which will retard the spark as much as possible to attempt to achieve the immediate torque.

In the maximum range mode, the actuation mode module 314 may instruct the cylinder actuator module 120 to turn off one or more cylinders to achieve the immediate torque request. The actuation mode module 314 may use spark retard for the remainder of the torque reduction by outputting the immediate torque request to the immediate torque control module 320. If there is not enough spark reserve capacity, the actuation mode module 314 may reduce the predicted torque request going to the predicted torque control module 316.

In the auto actuation mode, the actuation mode module 314 may decrease the predicted torque request output to the predicted torque control module 316. The predicted torque may be reduced only so far as is necessary to allow the immediate torque control module 320 to achieve the immediate torque request using spark retard.

The immediate torque control module 320 receives an estimated torque from a torque estimation module 324 and sets spark advance using the spark actuator module 126 to achieve the desired immediate torque. The estimated torque may represent the amount of torque that could immediately be produced by setting the spark advance to a calibrated value.

When the spark advance is set to the calibrated value, the resulting torque (maintaining the current APC) may be as close to mean best torque (MBT) as possible. MBT refers to the maximum torque that is generated for a given APC as spark advance is increased while using high-octane fuel. The spark advance at which this maximum torque occurs may be referred to as MBT spark. The torque at the calibrated value may be less than the torque at MBT spark because of, for example, fuel quality and environmental factors.

The immediate torque control module 320 can demand a smaller spark advance than the calibrated spark advance in order to reduce the estimated torque of the engine to the immediate torque request. The immediate torque control module 320 may also decrease the number of cylinders activated via the cylinder actuation module 120. The cylinder actuator module 120 then reports the actual number of activated cylinders to the immediate torque control module 320 and the torque estimation module 324.

When the number of activated cylinders changes, the cylinder actuator module 120 may report this change to the immediate torque control module 320 before reporting the change to the torque estimation module 324. In this way, the torque estimation module 324 receives the changed number of cylinders at the same time as the updated spark advance from the immediate torque control module 320. The torque estimation module may estimate an actual torque that is currently being generated at the current APC and the current spark advance.

The predicted torque control module 316 receives the estimated torque and may also receive a measured mass air flow (MAF) signal and an engine speed signal, referred to as a revolutions per minute (RPM) signal. The predicted torque control module 316 may generate a desired manifold absolute pressure (MAP) signal, which is output to a boost scheduling module 328. The boost scheduling module 328 uses the desired MAP signal to control the boost actuator module 162. The boost actuator module 162 then controls a turbocharger or a supercharger.

The predicted torque control module 316 may generate a desired area signal, which is output to the throttle actuator module 116. The throttle actuator module 116 then regulates the throttle valve 112 to produce the desired throttle area. The predicted torque control module 316 may use the estimated torque and/or the MAF signal in order to perform closed loop control, such as closed loop control of the desired area signal.

The predicted torque control module 316 may also generate a desired air per cylinder (APC) signal, which is output to a phaser scheduling module 332. Based on the desired APC signal and the RPM signal, the phaser scheduling module 332 commands the intake and/or exhaust cam phasers 148 and 150 to calibrated values using the phaser actuator module 158.

The torque estimation module 324 may use current intake and exhaust cam phaser angles along with the MAF signal to determine the estimated torque. The current intake and exhaust cam phaser angles may be measured values. Further discussion of torque estimation can be found in commonly assigned U.S. Pat. No. 6,704,638 entitled "Torque Estimator for Engine RPM and Torque Control," the disclosure of which is incorporated herein by reference in its entirety.

Referring now to FIG. 5, a functional block diagram of selected elements of the exemplary engine control system of FIG. 4 is presented. A torque ramp module 402 provides a ramping axle torque request to the axle torque arbitration module 304 of the ECM 300.

The torque ramp module 402 may request an increasing or decreasing torque ramp from the axle torque arbitration module 304. For example only, this torque ramp may be in response to the driver removing their foot from the accelerator pedal or a hybrid engine controller instructing the engine to shut down, for example.

The immediate torque control module 320 receives an immediate torque request via the hybrid optimization module 312, propulsion torque arbitration module 308, and the actuation mode module 314. The immediate torque request may include the torque ramp from the axle torque arbitration module 304.

The immediate torque control module 320 produces a desired spark advance for the spark actuator module 126 based on the number of cylinders that are activated. The immediate torque control module 320 also outputs the desired number of activated cylinders to the cylinder actuator module 120.

The cylinder actuator module 120 includes a fueling control module 410, a firing sequence dectection module 412, and a cylinder power determination module 414. The fueling control module 410 instructs the fuel injection system 124 as to which cylinders should receive fuel. The firing sequence detection module 412 determines which of the four strokes each cylinder is currently performing, which may be determined from a number of degrees of rotation of the crankshaft of the engine.

The firing sequence detection module 412 may receive a signal for each degree of rotation of the crankshaft or after every predetermined number of degrees of the crankshaft. The firing sequence detection module 412 may also receive signals indicating the angular position of the crankshaft after a larger number of degrees of rotation. For example only, the firing sequence detection module 412 may receive a signal at each cylinder firing event. For example only, in a V8, cylinder firing events may occur every 90 degrees of crankshaft rotation.

The firing sequence detection module 412 outputs cylinder event information to the fueling control module 410 and to the cylinder power determination module 414. When the fueling control module 410 receives a decreased desired number of cylinders from the immediate torque control module 320, the fueling control module 410 waits for the next fuel boundary.

The fueling control module 410 may deactivate a predetermined cylinder, or may deactivate the cylinder whose fuel boundary next occurs. Once the fuel boundary occurs, the fueling control module 410 instructs the fuel injection system 124 to stop providing fuel to that cylinder. The fueling control module 410 informs the cylinder power determination module 414 when each cylinder is deactivated.

The fueling control module 410 may wait until the next intake cycle of the recently deactivated cylinder before indicating to the cylinder power determination module 414 that fueling of the cylinder has been stopped. The cylinder power determination module 414 outputs the number of activated cylinders to the immediate torque control module 320.

The cylinder power determination module 414 may wait to output the reduced number of activated cylinders until it is time to determine a new spark advance. This new spark advance is generated to offset the reduction in torque realized at the time the now-deactivated cylinder fails to fire. For example, the new spark advance may be used for the cylinder that fires before or the cylinder that fires after the now-deactivated cylinder.

The cylinder power determination module 414 may send the reduced number of activated cylinders to the torque estimation module 324 after or when the new spark advance is generated. In this way, the torque estimation module 324 receives the reduced number of activated cylinders along with the corresponding increased spark advance. This may prevent the torque estimation module 324 from estimating a torque glitch, where an abrupt drop in torque caused by the cylinder deactivation is then offset by an increased spark advance. The estimated torque may be provided to the immediate torque control module 320 and to other modules, such as the hybrid optimization module 312 shown in FIG. 4.

Referring now to FIG. 6, a flowchart depicts exemplary steps performed by the elements shown in FIG. 5 to coordinate cylinder deactivation and spark advance. When a decreasing torque ramp to engine off minimum torque is requested by the torque ramp module 402 and received by the immediate torque control module 320, control begins in step 502.

In step 502, control initializes a variable NumCylinders to the total number of cylinders in the engine. Control continues in step 504, where NumCylinders is reported to spark control (the immediate torque control module 320) and torque estimation (the torque estimation module 324). Control continues in step 506, where control determines whether NumCylinders is equal to zero. If so, all cylinders are off and control ends; otherwise, control continues in step 507.

In step 507, control ramps the spark advance to a minimum value. For example only, the minimum value may be the minimum spark advance available where stable combustion is maintained. In step 508, control instructs cylinder X to be deactivated. Cylinder X, which is the next cylinder to be deactivated, may be chosen so that cylinders with adjacent firing times are not deactivated consecutively. For example, in the V8 timing diagram of FIG. 2, cylinders 3 or 4 may be deactivated after cylinder 1. Deactivating cylinder 2 after cylinder 1 may result in added vibration, as six cylinders will fire followed by a gap where two cylinders do not fire.

Control continues in step 510, where control waits until the fuel boundary of Cylinder X is reached. As described in FIG. 2, this may require up to two crankshaft revolutions. Control continues in step 512, where fuel is disabled for Cylinder X. Control continues in step 514, where control waits for two crankshaft revolutions. At this point, cylinder X has finished an intake stroke where no fuel was sprayed.

Control then continues in step 516, where NumCylinders is decremented. Control then continues in step 518, where NumCylinders is reported to spark control. Control continues in step 520, where spark control advances the spark for a cylinder that fires adjacently to when cylinder X would have fired if it contained an air-fuel mixture. This adjacent cylinder may be the cylinder that would fire immediately before cylinder X or the cylinder that would fire immediately after cylinder X.

The spark will remain advanced for future cylinder firing, although the spark advance will decrease to continue the decrease in torque ramp. The spark advance of step 520 may be an abrupt, discontinuous jump, while the spark advance otherwise follows a continuous downward contour that follows the downward ramp of the torque request. Control continues in step 522, where NumCylinders is reported to torque estimation. Torque estimation will now have received the advance spark timing, which combined with the reduced NumCylinders, will allow the torque estimation to accurately estimate engine torque. Control then returns to step 506.

When only a single cylinder change in deactivation is requested, steps 508 to 522 may be performed, without placing them in a loop that deactivates all cylinders. The steps of FIG. 6 can be easily adapted to achieve an increasing torque ramp. In such a case, the spark advance would be reduced as a cylinder is activated.

In various implementations, such as a port fuel injection engine, an array of Boolean flags may be defined, one for each cylinder. The flag corresponding to a cylinder is updated at the end of the cylinder's intake stroke. The flag is set to true if the cylinder had been fueled during its last intake stroke. The array can be summed to determine the number of cylinders that were fueled during their last intake stroke.

This count may be placed into a circular buffer, which is updated and read on a cylinder synchronous basis. The circular buffer introduces a delay, which may be measured in terms of cylinder events, from the end of the intake stroke until the time at which a spark change would be necessary to account for that cylinder's fueling change.

In various implementations, the delay may be from the intake stroke until an event that is used to schedule spark. The delay may be reduced to account for time used in switching domains from cylinder synchronous to time-based, which is the domain in which the torque control operates, and back to cylinder synchronous, which is the domain in which spark control operates.

The delayed cylinder count is referred to as the powered count. This is the count that can be used in the cylinder fraction term for spark control. To coordinate this cylinder fraction term with torque estimation, the cylinder fraction term may be saved from its time domain calculation into another variable at the time when the cylinder synchronous spark scheduling event occurs. This ensures that the time domain determination is able to be used by the time domain spark torque controller and then be consumed by the spark advance controller.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a torque control module that selectively generates a deactivation signal for a first cylinder of a plurality of cylinders of an engine based on a torque request; and
a fueling control module that halts fuel delivery to the first cylinder based on the deactivation signal, wherein the torque control module increases a spark advance of the engine at a first time after the fueling control module halts fuel injection for the first cylinder, and wherein the first time corresponds to an initial time combustion fails to occur in the first cylinder because fuel delivery has been halted.

2. The engine control system of claim 1 wherein the torque control module increases the spark advance beginning with a firing time of a second cylinder of the plurality of cylinders, wherein the second cylinder is one of directly before and directly after the first cylinder in a cylinder firing order.

3. The engine control system of claim 1 wherein the spark advance increase is determined based on a torque increase that offsets a torque decrease resulting from combustion failing to occur for the first cylinder.

4. The engine control system of claim 3 wherein the torque increase fully offsets the torque decrease.

5. The engine control system of claim 1 wherein when the torque request is a decreasing torque request, the torque control module decreases the spark advance to a minimum value prior to deactivating the first cylinder.

6. The engine control system of claim 5 wherein when the torque request is a decreasing torque request, the torque control module selectively decreases the spark advance to a second minimum value after increasing the spark advance, and selectively deactivates a second cylinder of the plurality of cylinders after the spark advance reaches the second minimum value.

7. The engine control system of claim 1 wherein the fueling control module halts fuel delivery to the first cylinder at an earliest fuel boundary following the deactivation signal for the first cylinder, wherein the fuel boundary is based on a time at which additional injected fuel will no longer be combusted in the next engine cycle of the first cylinder.

8. The engine control system of claim 1 further comprising:
a torque estimation module that determines an estimated torque; and
a cylinder power determination module that determines a first number of activated cylinders, decreases the first number by one after the fueling control module halts fuel injection for the first cylinder, and reports the first number to the torque control module prior to reporting the first number to the torque estimation module.

9. The engine control system of claim 8 wherein the torque estimation module determines the estimated torque based on the first number and the spark advance, wherein the cylinder power determination module reports the first number to the torque control module after the torque estimation module receives the increased spark advance.

10. The engine control system of claim 8 wherein the torque control module controls the spark advance based on the estimated torque.

11. A method comprising:
selectively generating a deactivation signal for a first cylinder of a plurality of cylinders of an engine based on a torque request;
halting fuel delivery to the first cylinder based on the deactivation signal; and
increasing a spark advance of the engine at a first time after the halting of fuel injection for the first cylinder, wherein the first time corresponds to an initial time combustion fails to occur in the first cylinder because fuel delivery has been halted.

12. The method of claim 11 further comprising increasing the spark advance beginning with a firing time of a second cylinder of the plurality of cylinders, wherein the second cylinder is one of directly before and directly after the first cylinder in a cylinder firing order.

13. The method of claim 11 further comprising determining the spark advance increase based on a torque increase that offsets a torque decrease resulting from combustion failing to occur for the first cylinder.

14. The method of claim 13 wherein the torque increase fully offsets the torque decrease.

15. The method of claim 11 further comprising, when the torque request is a decreasing torque request, decreasing the spark advance to a minimum value prior to deactivating the first cylinder.

16. The method of claim 15 further comprising, when the torque request is a decreasing torque request:
selectively decreasing the spark advance to a second minimum value after increasing the spark advance; and
selectively deactivating a second cylinder of the plurality of cylinders after the spark advance reaches the second minimum value.

17. The method of claim 11 further comprising halting fuel delivery to the first cylinder at an earliest fuel boundary following the deactivation signal for the first cylinder, wherein the fuel boundary is based on a time at which additional injected fuel will no longer be combusted in the next engine cycle of the first cylinder.

18. The method of claim 11 further comprising:
determining an estimated torque;
determining a first number of activated cylinders;
decreasing the first number by one after halting fuel injection for the first cylinder; and
using the decreased first number for determining the spark advance prior to using the decreased first number for determining the estimated torque.

19. The method of claim 18 further comprising:
determining the estimated torque based on the first number and the spark advance;
using the decreased first number for determining the estimated torque substantially simultaneously with using the increased spark advance for determining the estimated torque.

20. The method of claim 18 further comprising controlling the spark advance based on the estimated torque.

* * * * *